US009560562B1

(12) United States Patent
Vivanco et al.

(10) Patent No.: US 9,560,562 B1
(45) Date of Patent: Jan. 31, 2017

(54) METHOD AND SYSTEM FOR MANAGING A HANDOVER CONDITION IN A WIRELESS DEVICE

(71) Applicant: Sprint Spectrum LP, Overland Park, KS (US)

(72) Inventors: Daniel Vivanco, Sterling, VA (US); Krishna Sitaram, Chantilly, VA (US); Chunmei Liu, Great Falls, VA (US); Hemanth Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 78 days.

(21) Appl. No.: 14/315,599

(22) Filed: Jun. 26, 2014

(51) Int. Cl.
*H04W 36/12* (2009.01)
*H04W 36/00* (2009.01)
*H04W 72/04* (2009.01)
*H04W 24/08* (2009.01)

(52) U.S. Cl.
CPC ......... *H04W 36/12* (2013.01); *H04W 36/0083* (2013.01); *H04W 24/08* (2013.01); *H04W 72/04* (2013.01)

(58) Field of Classification Search
None
See application file for complete search history.

(56) References Cited

U.S. PATENT DOCUMENTS

| 8,532,652 | B1 | 9/2013 | Edara |  |
|---|---|---|---|---|
| 8,634,836 | B2 | 1/2014 | Pani et al. |  |
| 2011/0263260 | A1* | 10/2011 | Yavuz | H04W 36/0083 455/437 |
| 2012/0014267 | A1* | 1/2012 | Gomes | H04W 36/0088 370/252 |
| 2013/0064226 | A1* | 3/2013 | Dinan | H04W 36/0083 370/332 |
| 2013/0079049 | A1 | 3/2013 | Yu et al. | |
| 2013/0084892 | A1* | 4/2013 | Teyeb | H04W 4/023 455/456.6 |
| 2013/0095829 | A1* | 4/2013 | Bhattad | H04B 1/7107 455/434 |
| 2013/0107705 | A1* | 5/2013 | Dinan | H04W 72/0446 370/230 |
| 2014/0301360 | A1* | 10/2014 | Bontu | H04W 36/0083 370/331 |
| 2015/0296430 | A1* | 10/2015 | Bakker | H04W 36/0094 455/444 |

* cited by examiner

Primary Examiner — Kodzovi Acolatse

(57) ABSTRACT

Systems and methods are described for determining a handover condition in a wireless communication network. A plurality of active wireless devices in communication with a first access node may be detected. Measurement and reporting information may be received at the first access node from the wireless devices indicating proximity to a second access node. A criteria for selecting a wireless device in communication with the first access node for handover may be determined. A bias factor for the selected wireless device based on the received measurement and reporting information may be calculated. The bias factor may be provided to the selected wireless device and the first access node and/or a controller node may instruct the selected wireless device to communicate with the second access node.

14 Claims, 7 Drawing Sheets

METHOD AND SYSTEM FOR MANAGING A HANDOVER CONDITION IN A WIRELESS DEVICE

TECHNICAL BACKGROUND

Telecommunication systems, such as cellular networks or other wireless networks, use wireless signals to establish communication channels between various network devices. For example, an access node may transmit a reference signal or a pilot signal over a signal radius, and one or more wireless devices within the signal radius may attempt to establish a connection with the access node. In a heterogeneous network, a handover procedure for offloading traffic at hotspot areas can be negotiated between a source access node (e.g., strongest signal strength) and a target access node (e.g., short range, low power access node). This allows a wireless device to be served by an access node having the lowest signal path loss rather than by an access node having the strongest signal strength.

Interference can occur at the cell edge of the target access node due to the reference signal strength of the source access node. This interference can result in undesirable reduction in coverage, poor quality of service that dramatically decreases user experience, throughput to the wireless devices in communication with the short range access node, and handover failure.

OVERVIEW

Systems and methods are described for determining a handover condition in a wireless communication network. In one instance, a plurality of active wireless devices in communication with a first access node may be detected. Measurement and reporting information, indicating proximity to a second access node, may be received at the first access node from the wireless devices. A criteria for selecting a wireless device from the plurality of active wireless devices in communication with the first access node may then be determined. The communication network may calculate a bias factor for the selected wireless device based on the received measurement and reporting information and may provide the bias factor to the selected wireless device. The selected wireless device may then be instructed to communicate with the second access node.

DETAILED DESCRIPTION

Figure 1:
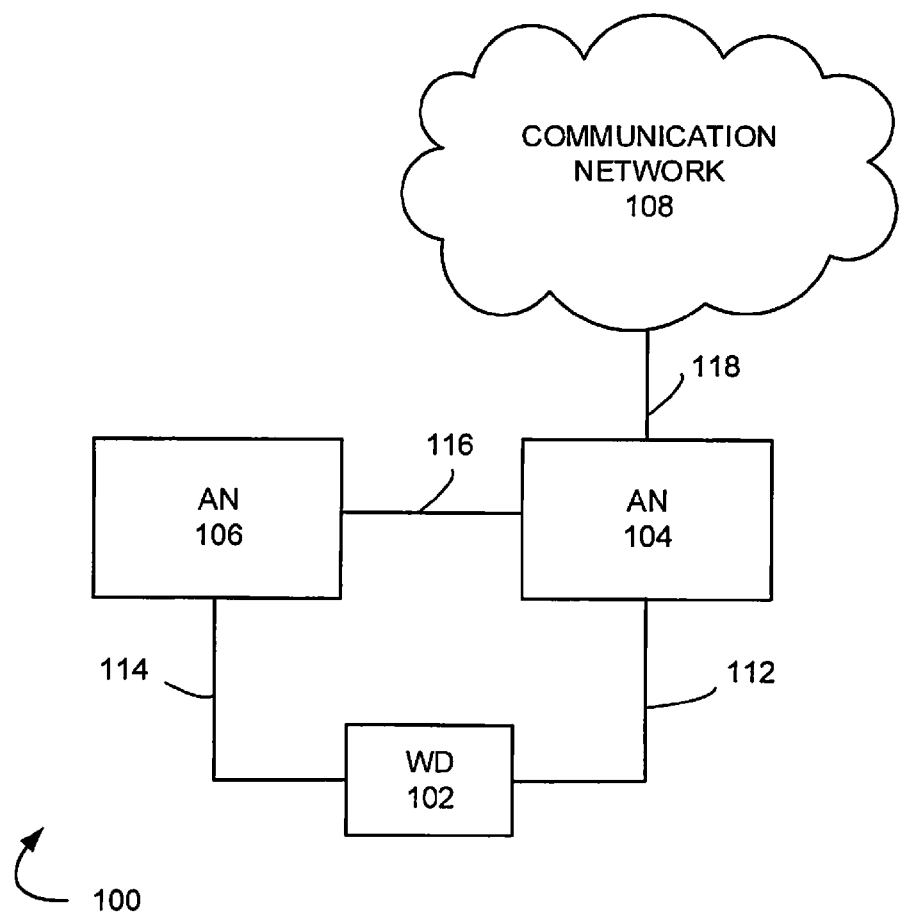
FIG. 1 illustrates an exemplary communication system of determining a handover condition in a communication network.

FIG. 1 illustrates an exemplary communication system 100 for determining a handover condition in a wireless communication network. Communication system 100 can comprise a wireless device 102, access nodes 104, 106, and communication network 108. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104, 106, and communication network 108 which are omitted for clarity, including additional processing nodes, routers, gateways, and physical and/or wireless data links for carrying data among the various network elements.

Wireless device 102 can be any device configured to communicate over system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104, 106, any number of wireless devices can be implemented according to various exemplary embodiments disclosed herein.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 104, 106 can be any network node configured to provide communication between wireless device 102 and communication network 108. Access nodes 104, 106 can be short range access nodes or standard access nodes. A short range access node could include a microcell base station, a picocell base station, a femtocell base station, or the like and a standard access node could include a base transceiver station, a radio base station, an eNodeB device, or an enhanced eNodeB device, or the like. It is noted that while two access nodes 104, 106 are illustrated in FIG. 1, any number of access nodes can be implemented within system 100.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying data, for example, to support voice, push-to-talk, broadcast video, and data communications by a wireless device such as wireless device 102. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Communication links 112, 114, 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114, 116, 118 can be a direct link or might include various equipment, intermediate components, systems, and networks.

Figure 2:
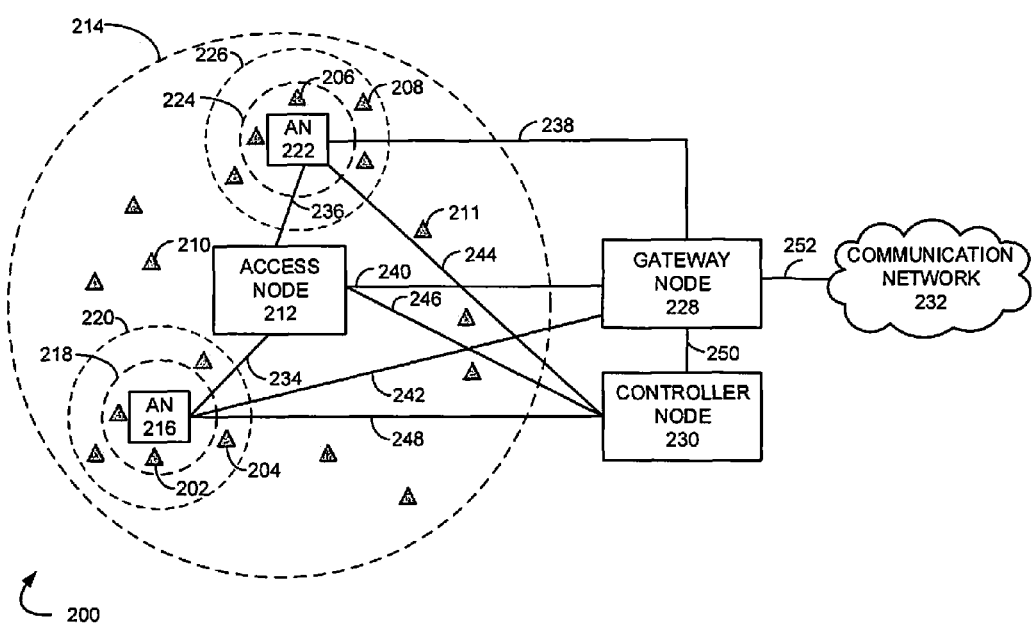
FIG. 2 illustrates another exemplary system for determining a handover condition in a communication network.

FIG. 2 illustrates an exemplary communication system 200 for determining a handover condition in a communication network. Communication system 200 can comprise wireless devices 202, 204, 206, 208, 210, 211 access nodes 212, 216, 222, gateway node 228, controller node 230, and communication network 232. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 212, 216, 222 and communication network 232, which are omitted for clarity, including additional processing nodes, routers, gateways, and physical and/or wireless data links for carrying data among the various network elements.

Wireless devices 202, 204, 206, 208, 210, 211 can be any device configured to communicate over communication system 200 using a wireless interface. For example, wireless devices 202, 204, 206, 208, 210, 11 can include a remote terminal unit, a cell phone, a smart phone, a computing platform such as a laptop, palmtop, or a tablet, a personal digital assistant, or an internet access device, and combinations thereof.

The wireless interface of wireless devices 202, 204, 206, 208, 210, 211 can include one or more transceivers for transmitting and receiving data over communication system 200. Each transceiver can be associated with the same or different frequency bands, the same or different radio access technologies, the same or different network providers, and/or the same or different services. For example, wireless devices 202, 204, 206, 208, 210, 211 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIG. 2 for clarity, wireless device 202, 204 can be in communication with access node 212, 216 and wireless device 206, 208 can be in communication with access node 212, 222 through communication links. Wireless device 210 can be in communication with access node 212 through a communication link. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 202 and access node 216 could share the same representative wireless link, but be transferred over different communication sessions, frequencies, timeslots, packets, ports, sockets, logical transport links, or in different directions—including combinations thereof.

Wireless devices 202, 204, 206, 208, 210, 211 can transmit and/or receive information over communication system 200 using various communication services. These services can include various voice, data, and/or MBMS services and applications. For example, mobile voice services, mobile data services, push-to-talk services, internet services web browsing, email, pictures, picture messaging, video, video messaging, broadcast video, audio, voicemail, music, MP3's, ring tones, stock tickers, new alerts, etc.

Access nodes 212, 216, 222 can be any network node configured to provide communication between wireless devices 202, 204, 206, 208, 210, 211 and communication network 232. Access nodes 212, 216, 222 can be standard access nodes or short range, low power access nodes. In an exemplary embodiment, access node 212 can be a standard access node having a coverage area 214. Access node 216 can be short range, low power access node having a coverage area 220 and access node 222 can be a short range, low power access node having a coverage area 226. Access nodes 216, 222 can be within at least a portion of an overlapping coverage area 214 of access node 212 where each access node 216, 222 has a coverage area that includes a cell edge portion between the full strength coverage area 218, 224 and the edge of the cell coverage area 220, 226.

A standard access node can be a macrocell access node such as a base transceiver station, a radio base station, an eNodeB device, or an enhanced eNodeB device, or the like. A short range access node can include a microcell base station, a picocell base station, a femtocell base station, or the like such as a home NodeB or a home eNodeB device. In addition, a wireless device configured to enter a hotspot mode can be a femtocell access node. It is noted that while three access nodes 212, 216, 222 are illustrated in FIG. 2, any number of access nodes can be implemented within system 200.

Access nodes 212, 216, 222 can comprise a processor and associated circuitry to execute or direct the execution of computer-readable instructions to obtain information. Access nodes 212, 216, 222 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 212, 216, 222 can receive instructions and other input at a user interface.

Gateway node 228 can be any network node configured to interface with other network nodes using various protocols that communicates, routes, and forwards communication data addressed to a wireless device 202, 204, 206, 208, 210, 211. In addition, gateway node 228 can act as a mobility anchor for wireless devices 202, 204, 206, 208, 210, 211 during handovers between different frequencies and/or different radio access technologies supported by the same access node. Gateway node 228 can be a standalone computing device, computing system, or network component, and can be accessible, for example, by a wired or wireless connection, or through an indirect connection such as through a computer network or communication network. For example, gateway node 228 can include a serving gateway (SGW) and/or public data network gateway (PGW), etc. One of ordinary skill in the art would recognize that gateway node 228 is not limited to any specific technology architecture, such as Long Term Evolution (LTE) and can be used with any network architecture and/or protocol.

Gateway node 228 can comprise a processor and associated circuitry to execute or direct the execution of computer-readable instructions to obtain information. Gateway node 228 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 228 can receive instructions and other input at a user interface.

Controller node 230 can be any network node configured to communicate information and/or control information over communication system 200. Controller node 230 can be configured to transmit control information associated with a handover procedure. Controller node 230 can be a standalone computing device, computing system, or network component, and can be accessible, for example, by a wired or wireless connection, or through an indirect connection such as through a computer network or communication network. For example, controller node 230 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 230 is not limited to any specific technology architecture, such as Long Term Evolution (LTE) and can be used with any network architecture and/or protocol.

Controller node 230 can comprise a processor and associated circuitry to execute or direct the execution of computer-readable instructions to obtain information. Controller node 230 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 230 can receive instructions and other input at a user interface.

Access node 212 can be in communication with access node 222 through communication link 236. Access node 222 can be in communication with gateway node 228 through communication link 238. Access node 212 can be in communication with gateway node 228 through communication link 240. Access node 216 can be in communication with gateway node 228 through communication link 242 and access node 212 through communication link 234. Access node 222 can be in communication with controller node 230 through communication link 244. Access node 212 can be in communication with controller node 230 through communication link 246. Access node 216 can be in communication with controller node 230 through communication link 248. Gateway node 228 can be in communication with controller node 230 through communication link 250 and with communication network 232 through communication link 252.

Communication links 234, 236, 238, 240, 242, 244, 246, 248, 250, 252 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 234, 236, 238, 240, 242, 244, 246, 248, 250, 252 can be a direct link or might include various equipment, intermediate components, systems, and networks.

Communication network 232 can be a wired and/or wireless communication network, and can comprise processing nodes, routers, gateways, and physical and/or wireless data links for carrying data among various network elements, including combinations thereof, an can include a local area network, a wide area network, and an internetwork (including the Internet). Communication network 232 can be capable of carrying data, for example, to support voice, push-to-talk, broadcast video, and data communications by a wireless device such as wireless device 202. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 232 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 232 can also comprise additional base stations, controller nodes, telephony switches, internet routers, network gateways, computer systems, communication links, or some other type of communication equipment, and combinations thereof.

Handover between two access nodes 212, 216 can occur when a wireless device 202 meets a handover condition threshold. The handover condition threshold can be, for example, loading at a source access node 212 or proximity to a target access node 216. When the handover condition meets the threshold, the wireless device 202 can transmit measurement and reporting information to the source access node 212 indicating proximity to a target access node 216. In an exemplary embodiment, the wireless device 202 has a subscription to the target access node 216, e.g., the target access node 216 has a Closed Subscriber Group Identity (CSG-ID) that corresponds to a CSG-ID stored in a CSG whitelist of the wireless device 202. The wireless device 202 may use CSG-ID information broadcasted by target access node 216 for access node (re)selection and handover purposes. Specifically, the wireless device 202 may use CSG Proximity Estimation to determine proximity to the target access node 216. Once the wireless device has determined it is near the target access node 216, it may provide a CSG Proximity Indication message to the communication network and source access node 212. Based on the received CSG Proximity Indication message, the communication network can determine a criteria for selecting a wireless device 202 and may choose the target access node 216 for handover of the selected wireless device 102. The source access node 212 may configure the selected wireless device 202 to perform specific CSG measurements and reporting, e.g., Report Proximity Configuration via an RRC Connection Reconfiguration message, for the target access node 216. The source access node 212 may handover the selected wireless device 202 to the target access node 216 and remove the Report Proximity Configuration via an RRC Connection Reconfiguration message for the selected wireless device 202 subscribed to the target access node 216.

In operation, the process of providing and removing the Report Proximity Configuration via an RRC Connection Reconfiguration message to the wireless device 202 creates, for example, wireless device 202 battery resource overhead and network signaling overhead. In addition to resource and network overhead, the target access node 216 may have lower transmission power than the source access node 212. This may result in decreased coverage range of the target access node 216 since the wireless device 202 tends to connect to a stronger Reference Signal Received Power (RSRP), e.g., the source access node 212, even when the wireless device 202 is located within a coverage area of the target access node 216. This may result in inefficient resource utilization between the source access node 212 and the target access node 216. Cell Range Expansion (CRE) provides the communication network with the opportunity to bias handover preferentially towards the target access node 216. This can be accomplished by calculating and applying a bias factor to the wireless device 202 based on the Proximity Indication message received at the source access node 212 and applying the bias factor to the transmission power of the target access node 216 so that the wireless device 202 preferentially selects the target access node 216 over the source access node 212. Applying the bias factor to a selected wireless device 202 reduces resource and network communications overhead through the disabling of proximity detection messaging between the source access node the wireless device.

Figure 3:
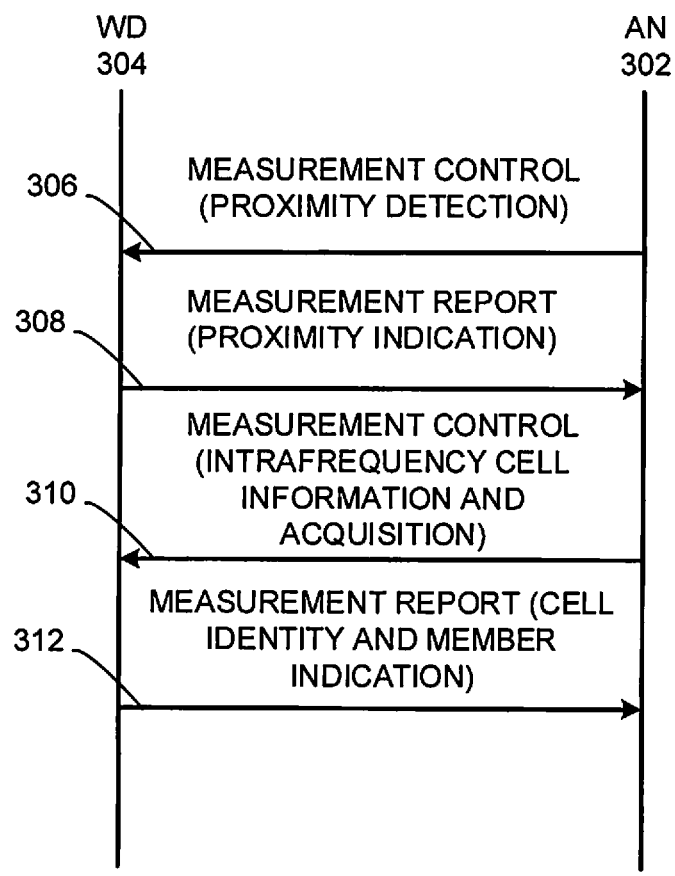
FIG. 3 illustrates a signaling diagram to illustrate a portion of an exemplary process for performing a handover to a closed group of access nodes in a wireless communication network.

FIG. 3 illustrates a signaling diagram to illustrate a portion of an exemplary process for performing a handover to a closed group of access nodes in a wireless communication network. The portion of an exemplary process for performing a handover illustrated in FIG. 3 can be implemented in the exemplary communication system 100 illustrated in FIG. 1, in the exemplary communication system 200 illustrated in FIG. 2, or with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 3, a wireless device 304 may initially establish a communication link with an access node 302 (e.g., upon initialization or during a handover procedure). Data addressed to the wireless device 304 may be communicated from a controller node to the wireless device 304 via the access node 302.

At 306, an access node can configure the selected wireless device with CSG Proximity detection as a measurement type. For example, a controller node can initiate CSG Proximity Estimation reporting by the wireless device 304 by configuring the wireless device 304 to determine, based on wireless device implementation (e.g., Global Positioning System), that it is near a target access node (not shown) whose CSG-ID is in the CSG whitelist of the wireless device.

At 308, a wireless device can send an "entering/leaving CSG Proximity" message (e.g., Proximity Indication message) when it determines it may be near a target access node whose CSG-ID is in the CSG whitelist of the wireless device. For example, the wireless device 304 can provide the source access node 302 with a Proximity Indication message indicating proximity to a target access node (not shown) whose CSG-ID is in the CSG whitelist of the selected wireless device 304. The Proximity Indication message can include information of whether the selected wireless device 304 is entering or leaving a corresponding frequency associated with the source access node 302 and/or the target access node (not shown). The source access node 302 can react to the received Proximity Indication message by configuring the selected wireless device 304 to perform specific measurements and reporting.

In an exemplary embodiment, the selected wireless device 304 is allowed to send the Proximity Indication message to the source access node 302 only if the source access node 302 indicates Report Proximity Configuration via an RRC Connection Reconfiguration message.

At 310, a source access node can configure a selected wireless device with a relevant measurement configuration for a specific target access node. For example, if a measurement configuration for a target access node (not shown) is not present, the source access node 302 can configure the selected wireless device 304 with a relevant measurement configuration for the target access node (not shown).

In an exemplary embodiment, the measurement configuration for the target access node (not shown) includes the Physical Cell Identifier (PCI) associated with the target access node (not shown).

At 312, a wireless device can send a measurement report to the source access node. For example, the wireless device 304 sends a measurement report to the source access node 302. The measurement report can include, for example, the measured Physical Cell Identifier (PCI), E-UTRAN Cell Global Identifier (ECGI), CSG-ID, and a CSG membership indication of the target access node (not shown). The selected wireless device 304 can send the measurement report to the source access node 302 due to a triggered intra-frequency event. The source access node 302 can then execute handover.

Figure 4:
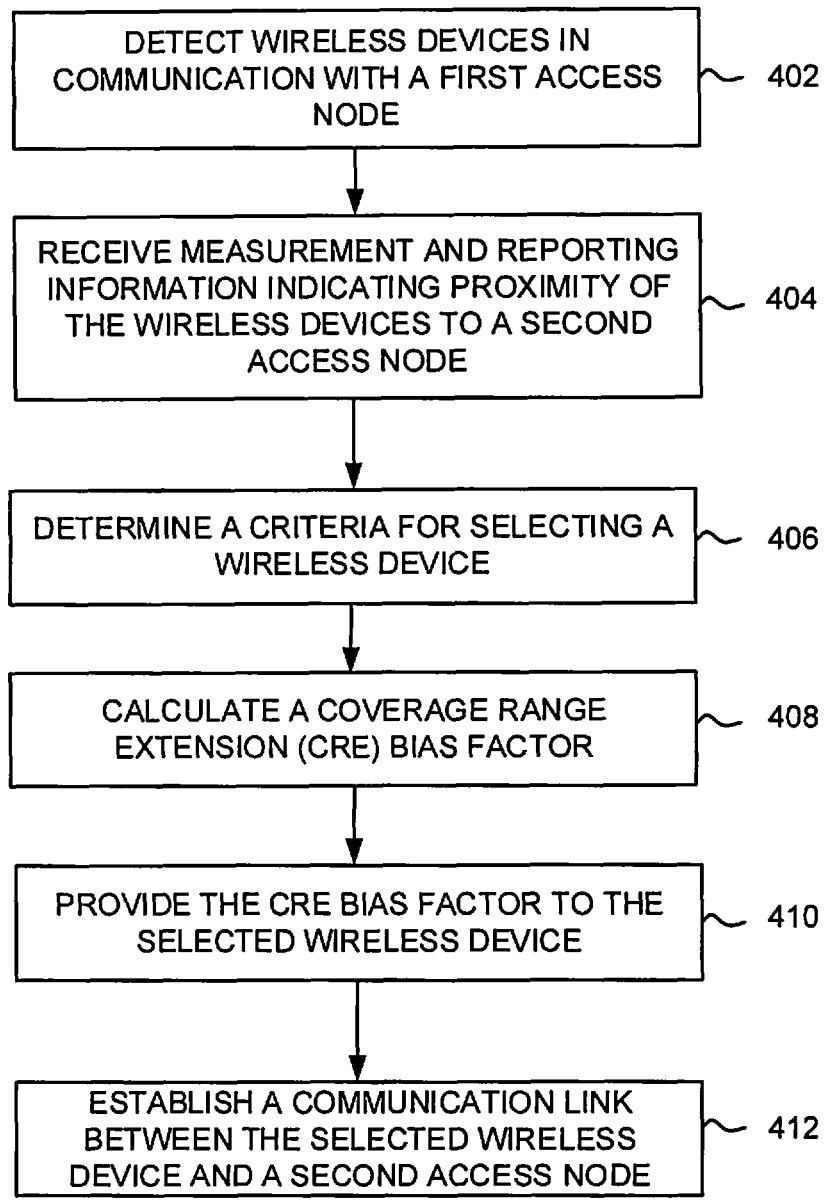
FIG. 4 illustrates an exemplary method of determining a handover condition in a communication network.

FIG. 4 illustrates a flow chart of an exemplary method of determining a handover condition in a wireless communication network. The method will be discussed with reference to the exemplary communication system 200 illustrated in FIG. 2. However, the method can be implemented in the exemplary communication system 100 illustrated in FIG. 1, in the signaling diagram of a portion of an exemplary process for performing a handover to a closed group of access nodes in a wireless communication network illustrated in FIG. 3, and with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 4, at step 402, a network node can detect a plurality of active wireless devices in communication with a first access node. For example, when a wireless device 202, 211 initially establishes communication with a source access node 212 (i.e., upon initialization or during a handover procedure), a request to establish a first communication link between source access node 212 and gateway node 228 can be transmitted to controller node 230. After the first communication link is established, data addressed to the wireless device 202, 211 can be communicated from the controller node 230 to the wireless device 202, 211 over the first communication link via access node 212.

At step 404, a source access node can receive measurement and reporting information from a wireless device indicating proximity to a target access node. For example, a target access node 216 can be deployed within a coverage area of a source access node 212. The source access node 212 can enable a Report Proximity Configuration via an RRC Connection Reconfiguration message and configure a wireless device 202, 211 to perform specific measurement and reporting. The wireless device 202 can send a Proximity Indication message to the source access node 212 informing the source access node 212 it is nearby a target access node 216 whose CSG-ID corresponds to an identity stored on an CSG whitelist of the wireless device 202 (e.g., selected wireless device). The wireless device 211 may also send a Proximity Indication message to the source access node 212 informing the source access node 212 it is nearby a target access node 216 whose CSG-ID does not correspond to an identity stored on a CSG whitelist of the wireless device, for example, wireless device 204.

In an exemplary embodiment, an algorithm is placed in the communication network 232. The algorithm monitors the Proximity Indication messages received from the selected wireless device 202 that correspond to the target access node 216 and the CSG-IDs of the wireless devices 202 that are connected to the source access node 212 at the source access node 212 (e.g., valid CSG subscription). The algorithm can pull the valid CSG subscription information of the selected wireless device 202 from the controller node 230. The controller node 230 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc.

At step 406, a network node can determine a criteria for selecting a wireless device in communication with the source access node. For example, the process of providing/removing relevant CSG measurement configuration and the large numbers of wireless devices 202, 211 sending Proximity Indication messaging to a source access node 212 requires both wireless device 202, 211 and network overhead (wireless device battery resources and signaling overhead). Network overhead results in a waste of radio resources. In response, for example, a controller node 230 can determine a criteria selecting a wireless device 202, 211 in communication with the source access node 212 for handover. The criteria can be, for example, a valid CSG subscription to the target access node 216, the time of day, proximity to a target access node 216, a predetermined time period, signal strength (e.g., Reference Signal Received Power), usage, frequency band, load at the source access node 212 and/or target access node 216 some other threshold condition, or any combination thereof.

At step 408, a network node can calculate a bias factor for a selected wireless device based on received measurement and reporting information. For example, in an exemplary embodiment, an algorithm can collect a Reference Signal Received Power ($RSRP_{Macro-j}$) from a source access node 212 and a Reference Signal Received Power ($RSRP_{CSG-Cell-i}$) from a target access node 216 that a selected wireless device 202 reports when sending an "entering/leaving CSG" message to the source access node 212. Based on observations, a Coverage Range Extension (CRE) bias factor ($\Delta_p$) is determined/calculated for each pair of a source access node 212 and target access node 216 deployed within a coverage area of the source access node 212.

At step 410, a network node can provide a calculated bias factor to a selected wireless device. For example, controller node 230 can provide a calculated CRE bias factor ($\Delta_p$) to a selected wireless device 202. In an exemplary embodiment, an algorithm requests via the controller node 230 that the source access node 212 deliver the calculated CRE bias factor ($\Delta_p$) to the selected wireless device 202 that have a valid subscription to a target access node 216. When the calculated CRE bias factor ($\Delta_p$) is determined and delivered to the selected wireless device 202, the algorithm via the controller node 230 removes the Report Proximity Configuration from the RRC Connection Reconfiguration message for the selected wireless device 202 subscribed to the target access node 216 (e.g., "CSG Proximity detection" is disabled).

In an exemplary embodiment, a fine-tuning factor $\xi$ may be applied to the CRE bias factor ($\Delta_p$) to encourage the selected wireless device 202 with a valid subscription to connect to the target access node 216 more often. The fine tuning factor $\xi$ may also be applied to reduce handover failure events.

At step 412, a network node can instruct a selected wireless device to communicate with a target access node. For example, the controller node 230 can instruct a selected wireless device 202 to communicate with a target access node 216 and the source access node 212 can proceed with the handover of the selected wireless device 202.

In an exemplary embodiment, once handover of the selected wireless device 202 to the target access node 216 has been completed, the algorithm can monitor handover performance for the selected wireless device 202 via the controller node 230. Based on handover performance of the selected wireless device 202 the algorithm via the controller node 230 may increase or decrease a fine tuning factor $\xi$ to reduce handover failure events.

One skilled in the art, using the disclosure provided herein, will appreciate that various steps of the methods can be omitted, rearranged, combined and/or adapted in various ways and can be completed by multiple wireless devices and access nodes, for example between wireless devices 204, 208, 210 and access node 222.

Figure 5:
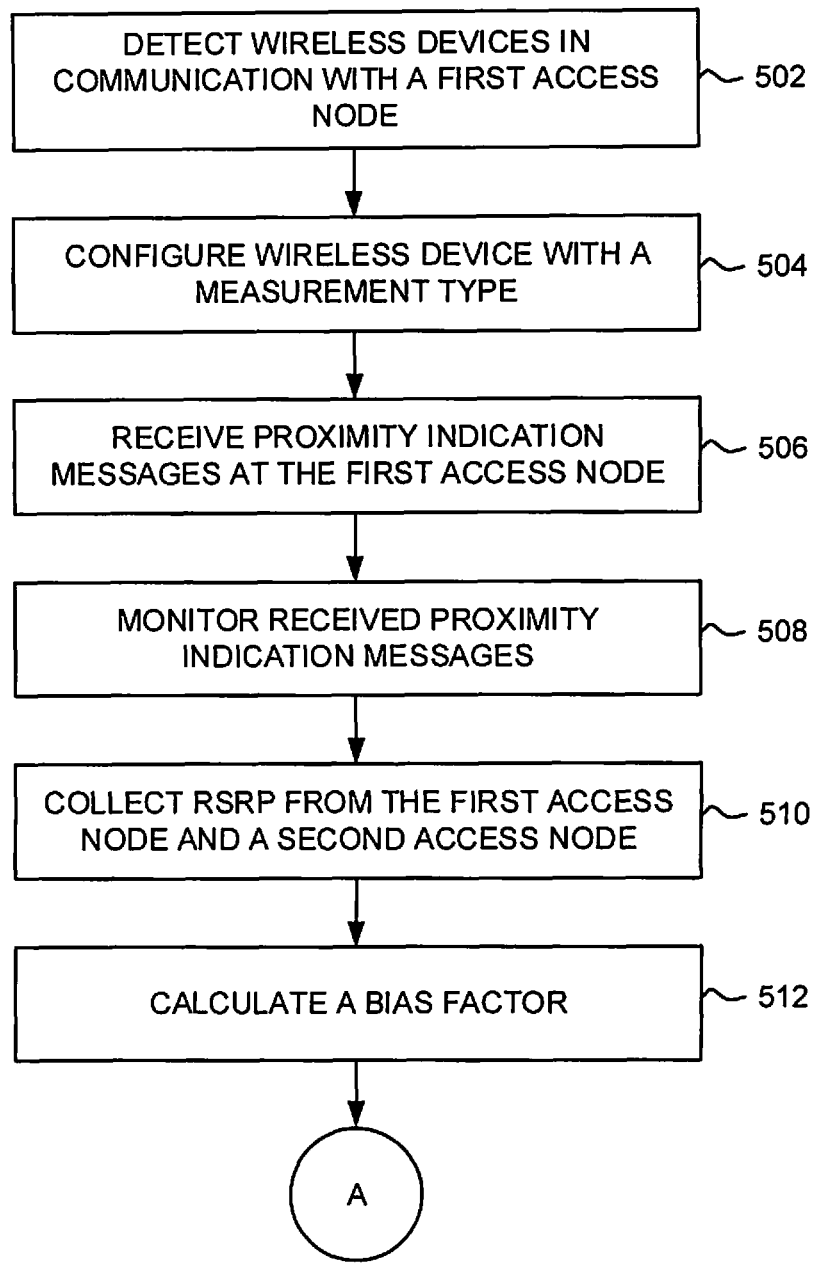
FIG. 5 illustrates another exemplary method for determining a handover condition in a communication network.

FIG. 5 illustrates an exemplary method of determining a handover condition in a wireless communication network. The method will be discussed with reference to the exemplary communication system for determining a handover condition in a communication network illustrated in FIG. 2. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 5, at step 502, a plurality of active wireless devices in communication with a source access node are detected. For example, when a wireless device 202, 204, 206, 208, 210, 211 initially establishes communication with a source access node 212 (i.e., upon initialization or during a handover procedure), a request to establish a first communication link between the source access node 212 and gateway node 228 can be transmitted to controller node 230. After the first communication link is established, data addressed to the wireless device 202, 204, 206, 208, 210, 211 can be communicated from the controller node 230 to the wireless device 202, 204, 206, 208, 210, 211 over the first communication link via the source access node 212.

In another exemplary embodiment, multiple access nodes may be individually identified by a unique CSG-ID. For example, a target access node 216, 222 may have a CSG-ID associated with an identity stored on the CSG whitelist of the selected wireless device 202, 204, 206, 208, 210 (e.g., a valid CSG subscription). The target access node 216, 222 can broadcast its CSG-ID in system information. The broadcasted CSG-ID of the target access node 216, 222 can be used by the selected wireless device 202, 204, 206, 208, 210 for re-selection and handover purposes.

At step 504, a source access node can configure a wireless device with a measurement type. For example, controller node 230 can initiate CSG Proximity Estimation reporting by the wireless device 202, 204, 206, 208, 210, 211 by configuring a wireless device 202, 204, 206, 208, 210, 211 to determine, based on wireless device implementation (e.g., Global Positioning System), that it is near a target access node 216, 222 whose CSG-ID is in the CSG whitelist of the wireless device 202, 204, 206, 208, 210 (e.g., selected wireless device).

In an exemplary embodiment, the target access node 216, 222 can be deployed within a coverage area of the source access node 212 and the source access node 212 can enable a Report Proximity Configuration via an RRC Connection Reconfiguration message. The source access node 212 can configure the wireless device 202, 204, 206, 208, 210, 211 to perform specific measurement and reporting. A selected wireless device 202, 204, 206, 208, 210 with a valid CSG Subscription to the target access node 216, 222 can send a Proximity Indication message to the source access node 212. The Proximity Indication message informs the source access node 212 that the selected wireless device 202, 204, 206, 208, 210 is near the target access node 216, 222.

At step 506, a source access node receives a Proximity Indication message from a wireless device (e.g., a Proximity Indication message). For example, a selected wireless device 202, 204, 206, 208, 210 can provide the source access node 212 with a Proximity Indication message indicating proximity of the selected wireless device 202, 204, 206, 208, 210 to a target access node 216, 222 whose CSG-ID is in the CSG whitelist of the wireless device 202, 204, 206, 208, 210. The Proximity Indication message can include information of whether the selected wireless device 202, 204, 206, 208, 210 is entering or leaving a corresponding frequency associated with the source access node 212 and/or the target access node 216, 222.

In an exemplary embodiment, a network node can determine a criteria for selecting a wireless device in communication with the source access node. For example, the process of providing/removing relevant CSG measurement configuration and the large numbers of wireless devices 202, 204, 206, 208, 210 sending Proximity Indication messaging to a source access node 212 creates wireless device 202, 204, 206, 208, 210 and network overhead (wireless device battery resources and signaling overhead). Network overhead results in a waste of radio resources. In response, for example, a controller node 230 can determine a criteria for selecting a wireless device 202, 204, 206, 208, 210 in communication with the source access node 212 for handover. The criteria can be, for example, a valid CSG subscription to the target access node 216, 222 the time of day, proximity to a target access node 216, 222 a predetermined time period, signal strength (e.g., Reference Signal Received Power), usage, frequency band, load at the source access node 212 and/or target access node 216, 222 some other threshold condition, or any combination thereof. The source access node 212 can react to the received Proximity Indication messages by configuring the selected wireless device 202, 204, 206, 208, 210 to perform specific measurement and reporting for the target access node 216, 222 for re-selection and handover purposes.

At step 508, an algorithm monitors received Proximity Indication messages reported by a wireless device. For example, an algorithm can be placed in the communication network 232. The algorithm can monitor the Proximity Indication messages received from the selected wireless device 202, 204, 206, 208, 210 at the source access node 212 that correspond to the target access node 216, 222. The algorithm can pull the CSG-ID subscription information of the selected wireless device 202, 204, 206, 208, 210 to the source access node 212 from the controller node 230 and monitor the CSG-ID subscription information of the wireless device 202, 204, 206, 208, 210 at the source access node 212. The controller node 230 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc.

At step 510, an algorithm can collect Reference Signal Received Power from the source access node and the target access node. For Example, an algorithm can be placed in the communication network 232. The algorithm can collect a Reference Signal Received Power (RSRP$_{Macro-j}$) of a source access node 212 and a Reference Signal Received Power (RSRP$_{CSG-Cell-i}$) of a target access node 216, 222 reported by a selected wireless device 202, 204, 206, 208, 210 when sending the Proximity Indication message to the source access node 212.

At step 512, an algorithm can calculate a Coverage Range Extension (CRE) bias factor ($\Delta_p$) for each pair of a source access node and target access node. For Example, an algorithm can collect RSRP$_{Macro-j}$ and RSRP$_{CSG-Cell-i}$ that a selected wireless device 202, 204, 206, 208, 210 reports when sending the Proximity Indication message. Based on observations and under the assumption that RSRP$_{Macro-j}$ is stronger than RSRP$_{CSG-Cell-i}$ when the selected wireless device 202, 204, 206, 208, 210 enters a coverage area of a target access node 216, 222 a CRE bias factor $\Delta_p$ can be estimated as $\Delta_p = RSRP_{Macro-j} - RSRP_{CSG-Cell-i} + \xi$.

$\xi$ is a fine-tuning factor that can be adjusted based on a learning process. Large $\xi$ may yield a large $\Delta_p$ which may impact usage experience of a selected wireless device 202, 204, 206, 208, 210 located within a cell range expansion area of the target access node 216, 222. For example, the target access node 216, 222 may have a lower transmission power compared to the source access node 212. In the presence of the source access node 212 the range of the target access node 216, 222 may become smaller. This occurs because the selected wireless device 202, 204, 206, 208, 210 tends to connect to the stronger $RSRP_{Macro-j}$ node even when the selected wireless device 202, 204, 206, 208, 210 is located within the target access node 216, 222 coverage area. This results in inefficient resource utilization between the source access node 212 and the target access node 216, 222. Small $\xi$ may yield a small $\Delta_p$ which may not result in enough bias to encourage the selected wireless device 202, 204, 206, 208, 210 to handover to the target access node 216, 222. CRE allows the communication network 320 to bias handover preferentially towards the target access node 216, 222 by adding a handover offset $\Delta_p$ to the target access node 216, 222 so that the selected wireless device 202, 204, 206, 208, 210 preferentially selects the target access node 216, 222 even when it is not the strongest access node. $\Delta_p$ can be delivered to the selected wireless device 202, 204, 206, 208, 210 by the communication network 320 or hardcoded on the selected wireless device 202, 204, 206, 208, 210.

Note that $\Delta_p$ is determined/calculated for each pair of a source access node 212 and target access node 216, 222. In an exemplary embodiment, the target access node 216, 222 is deployed within a coverage area of the source access node 212 and $RSRP_{Macro-j}$ and $RSRP_{CSG-Cell-i}$ are the average of many observations of received reference signal power messages.

In another exemplary embodiment, the algorithm can use load information received from the source access node 212 and target access node 216, 222 when determining the CRE bias factor $\Delta_p$. Load information can be used to encourage/discourage source access node 212 to target access node 216, 222 offload of the selected wireless device 202, 204, 206, 208, 210.

Figure 6:
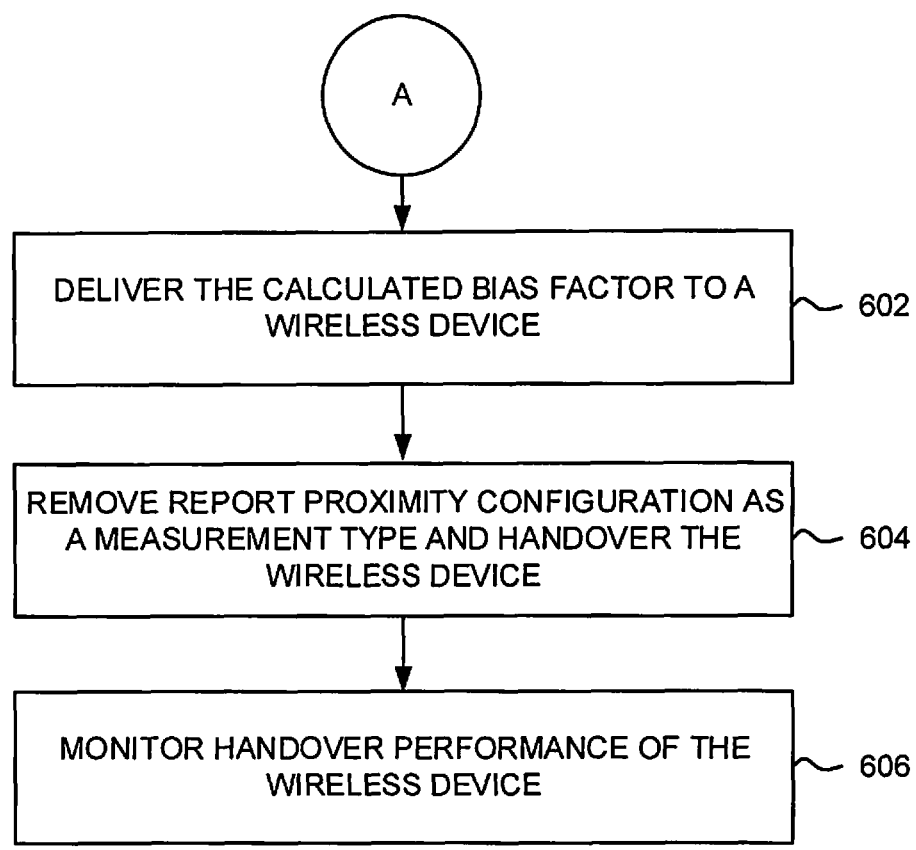
FIG. 6 illustrates another exemplary method for determining a handover condition in a communication network.

FIG. 6 illustrates an exemplary method of determining a handover condition in a wireless communication network. The method of FIG. 6 may follow the method of FIG. 5. The method will be discussed with reference to the exemplary communication system for determining a handover condition in a communication network illustrated in FIG. 2. However, the method can be implemented with any suitable communication system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 6, at step 602, a source access node may deliver a calculated CRE bias factor $\Delta_p$ to a wireless device connected to the source access node. For example, an algorithm placed in the communication network 232 can request that the source access node 212 deliver $\Delta_p$ to all of the wireless devices 202, 204, 206, 208, 210 connected to the source access node 212 that have a valid CSG subscription to the target access node 216, 222. Note that the algorithm identified these wireless devices 202, 204, 206, 208, 210 at steps 502-507 shown in FIG. 5.

In an exemplary embodiment, the algorithm provides a positive CRE bias factor $\Delta_p$ to all of the selected wireless devices 202, 204, 206, 208, 210 connected to the source access node 212. The algorithm can also provide a large negative CRE bias factor $\Delta_p$ to all of the wireless devices which do not have a valid subscription to a target access node 216, 222 for example wireless device 211. Note that the algorithm identified these wireless devices 211 at steps 502-507 shown in FIG. 5 as not being subscribed to the target access node 216, 222. This avoids signaling overhead generated by a wireless device 211 reporting a Reference Signal Received Power (RSRP) of a target access node 216, 222 that is not allowed to connect to the target access node 216, 222.

At step 604, a source access node can remove the RRC Connection Reconfiguration message delivered to the wireless device at step 504 shown in FIG. 5. For example, the algorithm placed in the communication network 232 can request that the source access node 212 remove Report Proximity Configuration from the RRC Connection Reconfiguration message delivered to the selected wireless device 202, 204, 206, 208, 210 with a valid CSG subscription to target access node 216, 222. The controller node 230 can instruct the selected wireless device 202, 204, 206, 208, 210 to communicate with the target access node 216, 222 and the source access node 212 can proceed with the handover of the selected wireless device 202, 204, 206, 208, 210.

At step 606, a controller node monitors handover performance of a wireless device. For example, once handover of the selected wireless device 202, 204, 206, 208, 210 to the target access node 216, 222 has been completed, the algorithm placed in the communication network 232 can monitor handover performance for the selected wireless device 202, 204, 206, 208, 210 via the controller node 230. Based on handover performance of the selected wireless device 202, 204, 206, 208, 210 the algorithm via the controller node 230 may increase or decrease the fine-tuning factor $\xi$ to reduce handover failure events.

In an exemplary embodiment, the algorithm adds a normalized fine-tuning factor $\xi$ (normalized) to the CRE bias factor. When usage experience of the selected wireless device 202, 204, 206, 208, 210 having a valid CSG subscription to the target access node 216, 222 and after handover to the target access node 216, 222 is not at a target the algorithm adjusts the fine-tuning factor $\xi$ to compensate. For example, when usage experience of the selected wireless device 202, 204, 206, 208, 210 is above target and/or handover failure counters from the source access node 212 to the target access node 216, 222 is low, the algorithm applies a larger fine-tuning factor $\xi$. When usage experience of the selected wireless device 202, 204, 206, 208, 210 is below a target and/or handover failures are high (e.g., large delays, low throughput), the algorithm applies a smaller fine-tuning factor $\xi$. Note that the algorithm will need to communicate the new $\Delta_p$ to the source access node 212 each time the fine-tuning factor $\xi$ is updated.

Figure 7:
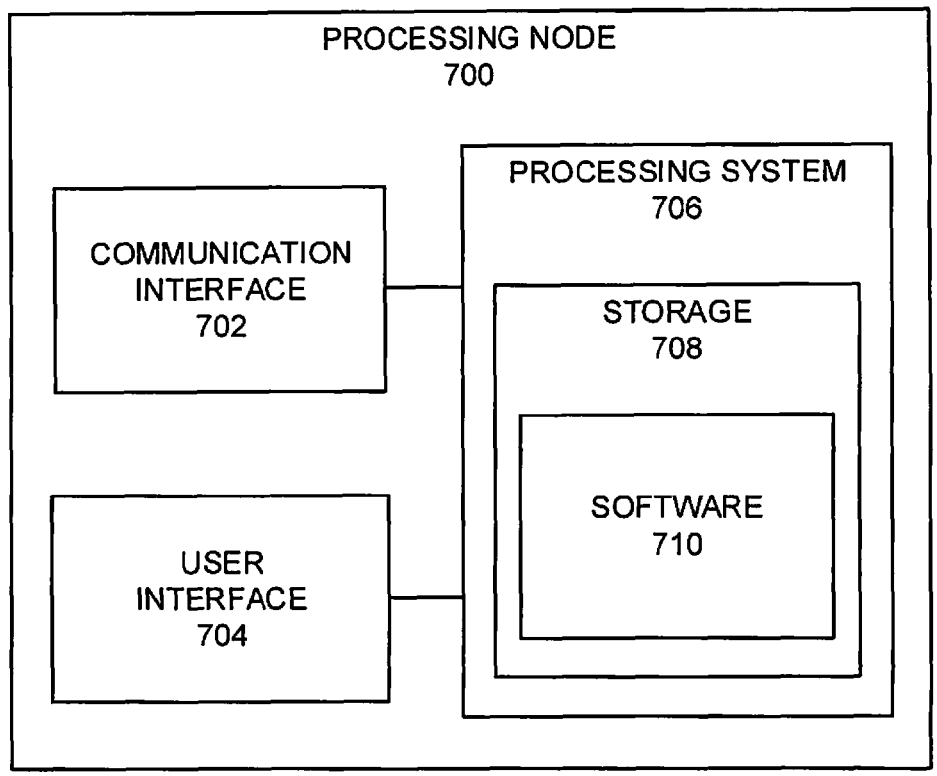
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104, 106, 212, 216, 222 gateway node 228 and controller nodes 230. Processing node 700 can also be an adjunct or component of a network element, such as an element of access nodes 104, 106, 212, 216, 222 gateway node 228 and controller node 230. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a handover condition in a wireless communication network, the method comprising:
    enabling proximity estimation reporting at a plurality of wireless devices connected to a first access node and located in a coverage area of the first access node;
    monitoring, at the first access node, proximity indication messages from one or more of the plurality of wireless devices with a valid subscription to a second access node, the proximity indication messages indicating a nearness to the second access node;
    calculating a bias factor for the first and second access nodes based on collected signal strengths reported by the one or more wireless devices at the first access node via the proximity indication messages;
    providing the calculated bias factor to the one or more wireless devices and disabling proximity estimation reporting at the one or more wireless devices;
    performing handover of the one or more wireless devices from the first access node to the second access node and instructing the one or more wireless devices to communicate with the second access node; and
    monitoring a usage experience of the one or more wireless devices at the second access node for a met criteria and, when the usage experience does not meet the criteria, applying a fine-tuning factor to the calculated bias factor.

2. The method of claim 1, wherein enabling proximity estimation reporting comprises configuring the one or more access nodes with closed access mode proximity detection as a measurement type.

3. The method of claim 2, further comprising removing the closed access mode proximity detection as a measurement type when the proximity estimation reporting is disabled at the one or more wireless devices.

4. The method of claim 1, further comprising:
    receiving, at the first access node from the plurality of wireless devices, measured control information and protocol specific data, geographic location, a closed access mode identity, and a closed access mode membership indication of the second access node based on a triggered intra-frequency event.

5. The method of claim 4, further comprising:
    receiving, at the first access node, information from the plurality of wireless devices indicating whether the wireless devices are entering or leaving a corresponding frequency associated with the first access node and/or second access node.

6. The method of claim 1, wherein the bias factor is further based on an average of multiple observations of the collected signal strengths of the first and second access nodes, wherein the bias factor is a range expansion and resource partitioning bias factor value.

7. The method of claim 1, wherein the second access node is deployed within the coverage area of the first access node.

8. A method for determining a handover condition in a wireless communication network, the method comprising:
    detecting a plurality of active wireless devices in communication with a first access node;
    selecting a wireless device based on a criteria from the plurality of wireless devices in communication with the first access node;
    receiving from the selected wireless device a first parameter associated with a second access node and an indication of proximity to the second access node;
    determining a bias factor based on the first parameter and a fine-tuning factor;

providing the bias factor to the selected wireless device;
performing handover of the selected wireless device from the first access node to the second access node and instructing the selected wireless device to establish a communication link with the second access node; and
monitoring a usage experience of the selected wireless device at the second access node and, when the usage experience of the selected wireless device does not meet a target, adjusting the fine-tuning factor based on a second parameter and updating the bias factor using the fine-tuning factor.

9. A system for determining a handover condition in a wireless communication network, the system comprising:
a first access node and a controller node, the controller node configured to:
enable proximity estimation reporting at a plurality of wireless devices connected to the first access node and located in a coverage area of the first access node;
monitor, at the first access node, proximity indication messages from one or more of the plurality of wireless devices with a valid subscription to a second access node, the proximity indication messages indicating nearness to the second access node;
calculate a bias factor value for the first and second access nodes based on collected signal strengths reported by the one or more wireless devices at the first access node via the proximity indication messages;
provide the calculated bias factor to the one or more wireless devices and disable proximity estimation reporting at the one or more wireless devices;
perform handover of the one or more wireless devices from the first access node to the second access node and instruct the one or more wireless devices to communicate with the second access node; and
monitor a usage experience of the one or more wireless devices at the second access node for a met criteria and, when the usage experience does not meet the criteria, apply a fine-tuning factor to the calculated bias factor.

10. The system of claim 9, wherein the controller node is further configured to:
provide the one or more wireless devices with closed access mode proximity detection as a measurement type.

11. The system of claim 9, wherein the controller node is further configured to:
remove the closed access mode proximity detection as a measurement type when the proximity estimation reporting is disabled at the one or more wireless devices.

12. The system of claim 9, wherein the controller node is further configured to:
receive, at the first access node from the plurality of wireless devices, measured control information and protocol specific data, geographic location, closed access mode identity, and closed access mode membership indication of the second access node based on a triggered intra-frequency event.

13. The system of claim 12, wherein the controller node is configured to detect a location of the plurality of wireless devices when the plurality of wireless devices enters or leaves a corresponding frequency associated with the first access node and/or the second access node.

14. The system of claim 9, further comprising:
the first access node configured to:
monitor a closed access mode identity subscription of the one or more wireless devices.

* * * * *